United States Patent
Marshall et al.

(10) Patent No.: US 8,417,664 B2
(45) Date of Patent: Apr. 9, 2013

(54) METHOD AND APPARATUS FOR DATABASE UNLOADING

(75) Inventors: Brian J. Marshall, Napa, CA (US); Mark D. Henderson, Thousand Oaks, CA (US)

(73) Assignee: CA, Inc., Islandia, NY (US)

( * ) Notice: Subject to any disclaimer, the term of this patent is extended or adjusted under 35 U.S.C. 154(b) by 1726 days.

(21) Appl. No.: 11/130,977

(22) Filed: May 16, 2005

(65) Prior Publication Data

US 2006/0259502 A1   Nov. 16, 2006

(51) Int. Cl.
*G06F 7/00* (2006.01)
*G06F 17/30* (2006.01)
*G06F 12/00* (2006.01)

(52) U.S. Cl.
USPC ............................ 707/602; 707/809; 707/829

(58) Field of Classification Search .................. 707/602, 707/809, 829
See application file for complete search history.

(56) References Cited

U.S. PATENT DOCUMENTS

| | | | | |
|---|---|---|---|---|
| 5,761,667 A * | 6/1998 | Koeppen | | 707/707 |
| 6,519,613 B1 * | 2/2003 | Friske et al. | | 707/202 |
| 6,622,142 B1 * | 9/2003 | Murray et al. | | 707/707 |
| 6,834,290 B1 * | 12/2004 | Pugh et al. | | 707/205 |
| 7,720,805 B1 * | 5/2010 | Martin, Jr. | | 707/602 |
| 2002/0198860 A1 * | 12/2002 | Smith | | 707/1 |
| 2003/0088572 A1 * | 5/2003 | Smith | | 707/707 |
| 2003/0149683 A1 * | 8/2003 | Lee et al. | | 707/1 |
| 2003/0167214 A1 * | 9/2003 | Kang | | 705/29 |
| 2005/0240638 A1 * | 10/2005 | Fisher | | 707/205 |
| 2006/0106835 A1 * | 5/2006 | Murray et al. | | 707/707 |
| 2006/0136661 A1 * | 6/2006 | Toshine | | 711/111 |

OTHER PUBLICATIONS

PCT Written Opinion (PCT/US2006/019129), Sep. 6, 2006.
PCT International Search Report (PCT/US2006/019129), Sep. 6, 2006.

* cited by examiner

*Primary Examiner* — Mariela Reyes
*Assistant Examiner* — Alexandria Bromell
(74) *Attorney, Agent, or Firm* — Baker Botts, L.L.P.

(57) ABSTRACT

A method for unloading a database includes copying a data set in physical sequence from a database to a data space and unloading the data set in hierarchical sequence from the data space.

65 Claims, 8 Drawing Sheets

METHOD AND APPARATUS FOR DATABASE UNLOADING

BACKGROUND

1. Technical Field

The present disclosure relates to databases and, more specifically, to a method and apparatus for database unloading.

2. Description of the Related Art

A database is an organized collection of data. Most databases are computerized and are stored on computer-readable storage devices, such as hard disks. Computerized databases are frequently built, maintained and called upon to store, organize, and retrieve useful information as needed. A database manager is generally a computer program that is designed to store, organize, and retrieve computerized database information.

Database information is generally organized in a hierarchical sequence. However, the physical sequence that the database information is generally stored in on the storage device may not necessarily reflect the hierarchical sequence. Tables may be used to correlate the hierarchical sequence of the data in the database with the physical sequence of the data on the storage device.

Figure 1:
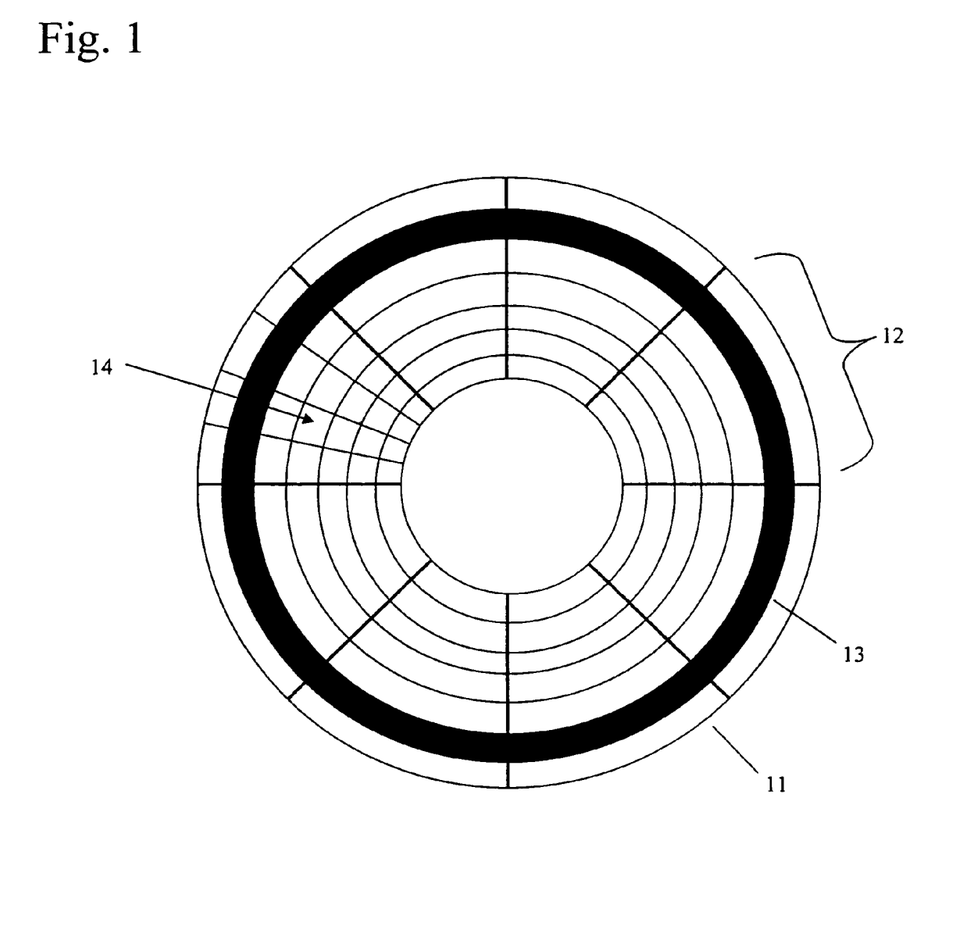
FIG. 1 shows a schematic diagram of a hard disk.

This distinction is generally a product of how storage devices, such as hard disks, store information. FIG. 1 shows a schematic diagram of a hard disk. A hard disk may have one or more platters 11 that are used to store information. Each platter 11 may be divided by radial lines into sectors 12. Each sector may be further divided by concentric circles into tracks 13. Each track 13 may be further divided into clusters 14.

As data, such as database information, is written to and removed from the various clusters 14, free space may become discontinuous leading to the storage of new data in discontinuous clusters 14. This phenomenon is generally referred to as fragmentation. Computer operating systems that allow for the utilization of storage devices, such as hard disks, often handle the storage and retrieval of data so that applications such as database managers need not worry about the correlation of fragmented data from the hierarchical sequence to the physical sequence when engaging in the reading, writing, or manipulation of data. Data within a database can become fragmented as well, similar to the process by which data on an external storage device becomes fragmented. So fragmentation actually happens at multiple levels. One of the problems to be solved relates to the internal fragmentation of the database data itself.

Of the many functions that database managers perform, database managers must often unload database information. Unloading database information includes copying information from a database and then writing that information to a destination. For example, database information may be unloaded to a file or another database. Where database information is unloaded from a source database to a destination, database managers generally seek to copy the source database information in its hierarchical order. As each unit of database information is unloaded, its physical location on the storage device must be ascertained, that location must be sought by the storage device, and each unit of data must be read before it may be unloaded. Because database information may be discontinuously stored, there may be a very large number of very small data transfers as continuous sections of discontinuous database information are sought, read and unloaded. This process may therefore generate a high level of random I/O from the storage device. This high level of random I/O may significantly slow the process of unloading data.

It is therefore desirable to utilize a method and apparatus for unloading a database that can unload the database more efficiently than previously known methods.

SUMMARY

A method for unloading a database includes copying a data set in physical sequence from a database to a data space and unloading the data set in hierarchical sequence from the data space.

A system for unloading a database includes a copying unit for copying a data set in physical sequence from a database to a data space and an unloading unit for unloading the data set in hierarchical sequence from the data space.

A computer system includes a processor and a computer recording medium readable by the processor and including computer executable code executable by the processor for unloading a database. The computer executable code includes code for copying a data set in physical sequence from a database to a data space and code for unloading the data set in hierarchical sequence from the data space.

A computer recording medium includes computer executable code for unloading a database. The computer executable code includes code for copying a data set in physical sequence from a database to a data space and code for unloading the data set in hierarchical sequence from the data space.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Figure 2:
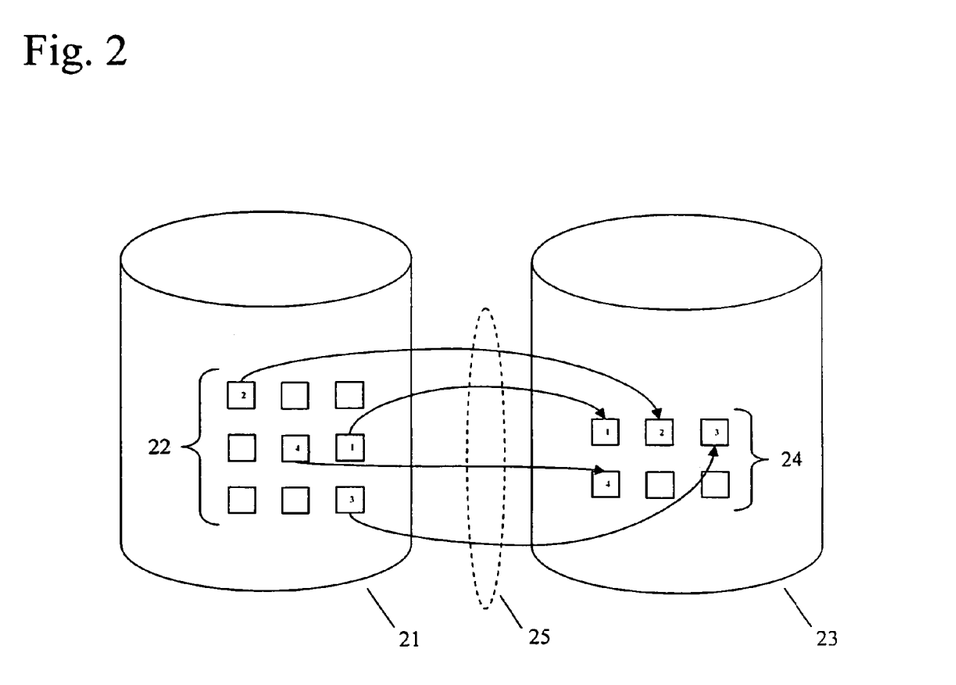
FIG. 2 is a schematic showing the unloading of a database.

Embodiments of the present disclosure seek to unload a database more efficiently than methods previously known. FIG. 2 is a schematic showing the unloading of a database. The source database 22 may be stored on a source storage device 21. The source database 22 may be made up of multiple units of data, among them the data units labeled 1-4. The units of data stored on the source storage device 21 may be stored according to a physical sequence that may be different than a hierarchical sequence that the database manager perceives the data to be stored in.

The source database 22, or a portion of it, may be unloaded to a destination storage device 23. For example, the source database 22 may be unloaded to a destination database 24 on the destination storage device 23. Because the units of data that make up the source database 22 may be discontinuous, unloading of the source database 22 may involve a great amount of random I/O 25 as the source storage device 21 repeatedly seeks units of data, unloads those units of data and then repeats the process for the next units of data until all units of data have been unloaded.

Figure 3:
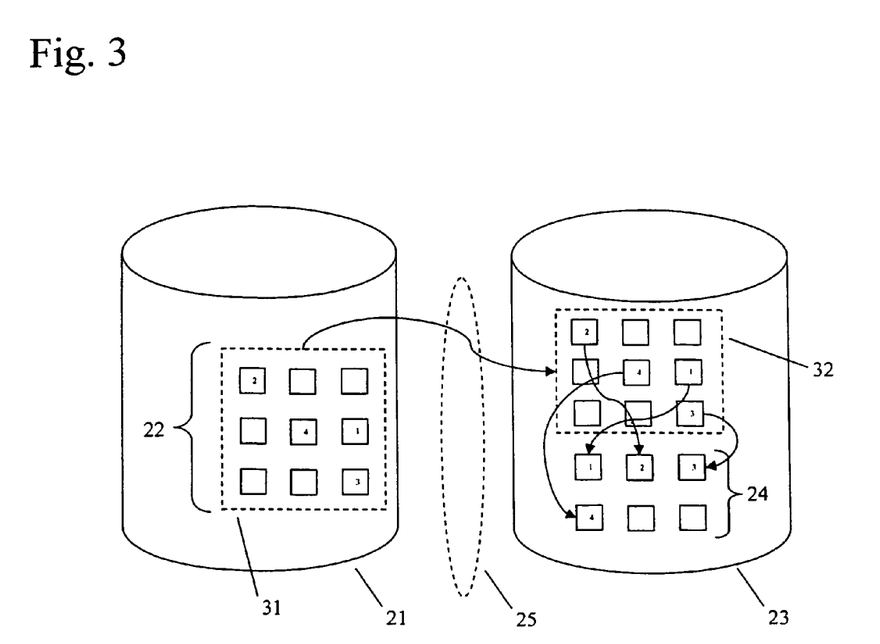
FIG. 3 is a schematic showing the unloading of a database according to an embodiment of the present disclosure.

Embodiments of the present disclosure seek to speed up the unloading process by reducing random I/O. FIG. 3 is a schematic showing the unloading of a database according to an embodiment of the present disclosure. A block of data 31 from the database 22 may be copied, for example, cluster-by-cluster, to a data space 32 on the destination storage device 23. In so doing, the block of data 31 may be read sequentially, for example, using parallel asynchronous I/O. This block of data 31 may be a continuous group of units of data according to physical location. For example, the block of data may be a range of clusters on the source storage device 21.

A data space is a data-only space that may be used to store data with integrity and isolation. A data space is a byte addressable address space that contains only data in real memory backed by storage. A data space functions similarly to a disk cache on a personal computer. The data space 32 on the destination storage device 23 may be, for example, an existing data space technology incorporated into the destination database 24 and located within the destination storage device 23. Data spaces incorporated into database technology for other purposes may be utilized for this purpose. For example, data spaces created to hold temporary data for future processing may be used. An example of such a data space includes a data space used during a reload process to hold temporary data that may ultimately become an overflow data set of an HDAM database. An HDAM database is a database that uses the HDAM access method for accessing data. The overflow data set is a secondary area of the HDAM database data set used for storing information that did not fit well into the primary area of the HDAM database dataset called the Root Addressable Area (RAA).

Alternatively, the data space used may be memory, for example a memory buffer used to temporarily store data. Where memory is used as the data space, the data space need not be physically located within the destination storage device.

The copied data on the data space 32 may then be unloaded hierarchically to the destination database 24 on the destination storage device 23 thereby reducing random I/O 25 and potentially speeding up the unload process.

Figure 4:
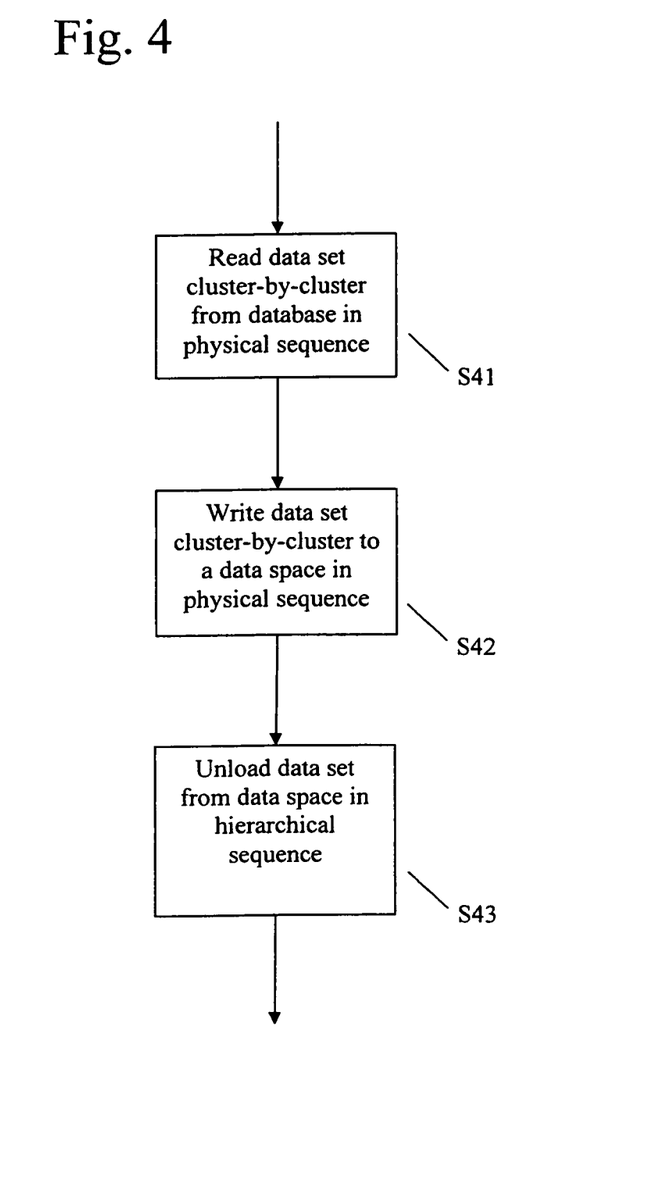
FIG. 4 is a flow chart showing a method for unloading database data according to an embodiment of the present disclosure.

FIG. 4 is a flow chart showing a method for unloading database data according to an embodiment of the present disclosure. First, data may be read, for example, cluster-by-cluster, from the source database in physical sequence (Step S41). The read data may then be written to a data space associated with a destination database that is located within the same destination storage device as the destination database (Step S42). In so doing, the data may retain the same physical sequence as it has in the source database. Data may then be unloaded from the data space to the destination database in a hierarchical sequence (Step S43). It is important to note here that the physical device type is of no consequence here. The source and destination devices can be any valid storage device, the data from S42 simply needs to be ascertained in the correct hierarchical sequence when presented to the device at step S43. The steps of reading the data (Step S41) and writing the data (Step S42) may alternatively be described as copying the data.

Figure 5:
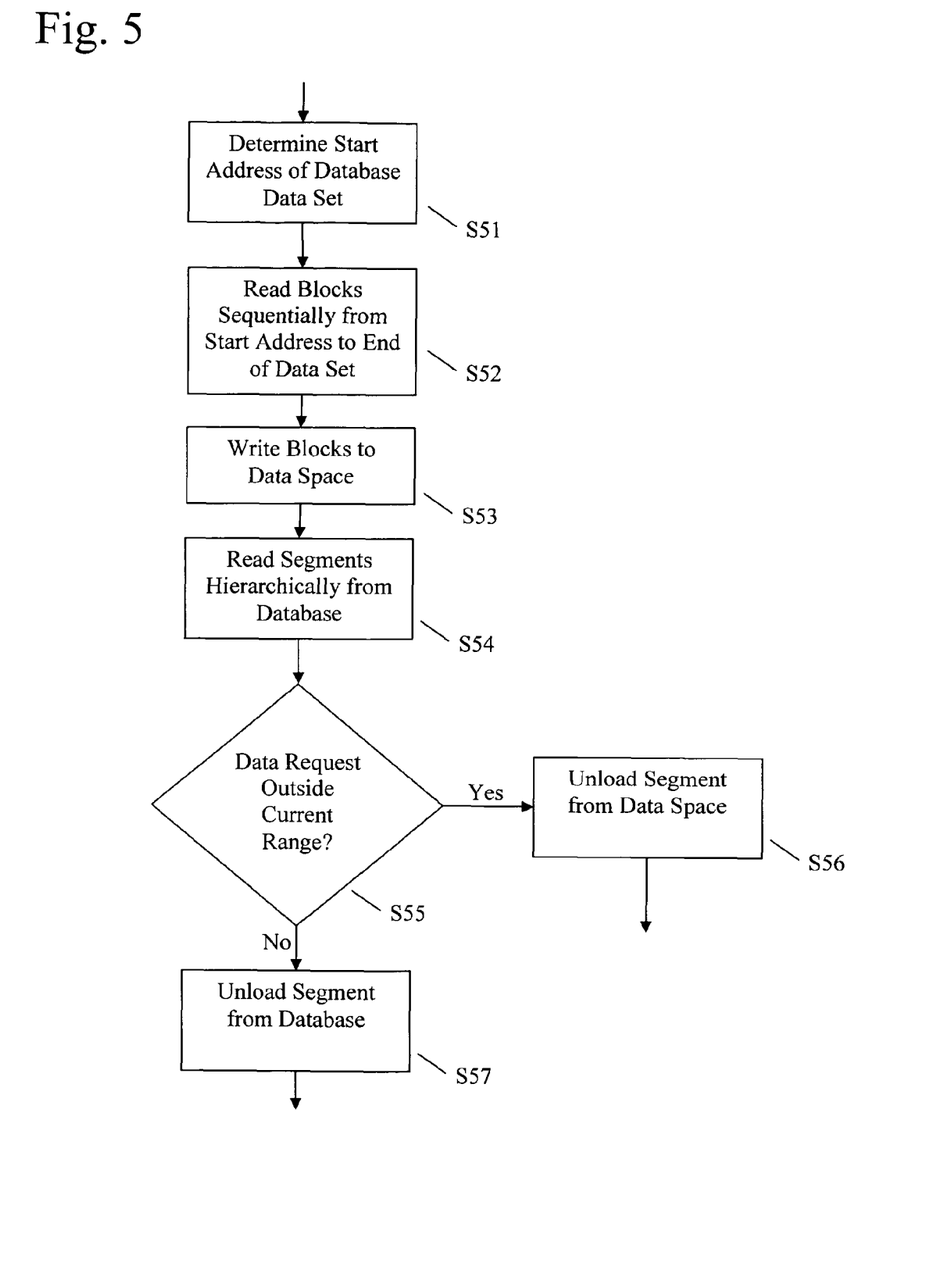
FIG. 5 is a flow chart showing a more detailed method for unloading database data according to an embodiment of the present disclosure.

The embodiment of the present disclosure shown in FIG. 5 may be useful when unloading databases that have overflow portions of a data set and/or multiple data set groups. This is because there may be a very high likelihood that segments in these databases will be read randomly. For such databases, the following embodiment of the present disclosure may take the overflow portions of the data set; either by its self or along with other portions of the data set, and read them sequentially into a data space. The segments may then be randomly accessed in the data space potentially reducing random I/O that may be associated with randomly accessing the segments from the database itself.

FIG. 5 is a flow chart showing a more detailed method for unloading database data according to this embodiment of the present disclosure. First, the start address of the database data set on the source storage device may be determined (Step S51). Blocks of data, for example storage device clusters or any other unit of physical storage, may be read sequentially, for example, block-by-block from the determined start address till the end of the data set (Step S52). As noted above, the data set may be an overflow portion of the data set; either by itself or along with other portions of the data set. The read blocks may then be written, for example, in the same order as they were read, into the data space (Step S53). Then, as the unload process begins, the operating system (OS) may use access methods to read segments of data hierarchically from the source database (Step S54). For normal unload purposes data is read directly from the storage device into a buffer in memory. The size of this buffer can be referred to as a range. As the unload progresses the size of the range does not change but the start and end points of the range move through the database. This range is like a window and anything in that window can be accessed without additional I/O since it is copied into the buffer through the use of sequential I/O. The database is then unloaded hierarchically from the start of the database using the data in the buffer. As the unload progresses data retrieval is requested based on internal information stored in the database. If the data requested is within the range (No, Step S55), the segment is unloaded from the source database (Step S57). However, if the data requested is outside of the current range (Yes, Step S55), then the segment is unloaded from the data space copy of the database (Step S56) rather than the source database, thereby significantly reducing the number of reads and/or random I/O necessary to complete the unload process.

Embodiments of the present disclosure may be used to unload databases that may or may not have overflow portions. Where overflow portions exist, the overflow portions may be copied to a data space as described above. Embodiments of the present disclosure may be used to unload databases with one or more data sets. Where a database has more than one data set, each data set may be copied to a separate data space or one or more data sets may be copied to the same data space.

Embodiments of the present disclosure may copy the data sets to the data space only where it is determined that the data should be so copied. For example, the database may be analyzed to determine if copying the data set to the data space is advisable. For example, the database may be analyzed to determine if the database includes long database records. Where long database records exist it may be advisable to copy the data set to the data space. Long database records may be observed by examining the number of clusters or blocks between the lowest and highest segments in the record.

An application may be designed to perform one or more of the methods of the present disclosure. Alternatively, one or more of the methods of the present disclosure may be added to a preexisting application, for example, a database manager. When an application is performing the one or more methods of the present disclosure, it may be beneficial to perform one or more initialization steps that may facilitate the one or more methods of the present disclosure.

The one or more methods of the present disclosure may be executed by intercepting an unload request. Where an initialization is to be performed, the initialization may also be executed when an unload request is intercepted.

Initialization may include initializing one or more control blocks used to manage the data space, creating one or more data spaces, initializing one or more I/O buffers, and/or opening the database data set.

After an application has performed one or more methods of the present disclosure, it may be beneficial to perform one or more termination steps that may facilitate the one or more methods of the present disclosure. The termination steps may be initiated by the interception of an unload close request. The termination steps may include, for example, deleting all created data spaces.

Figure 6:
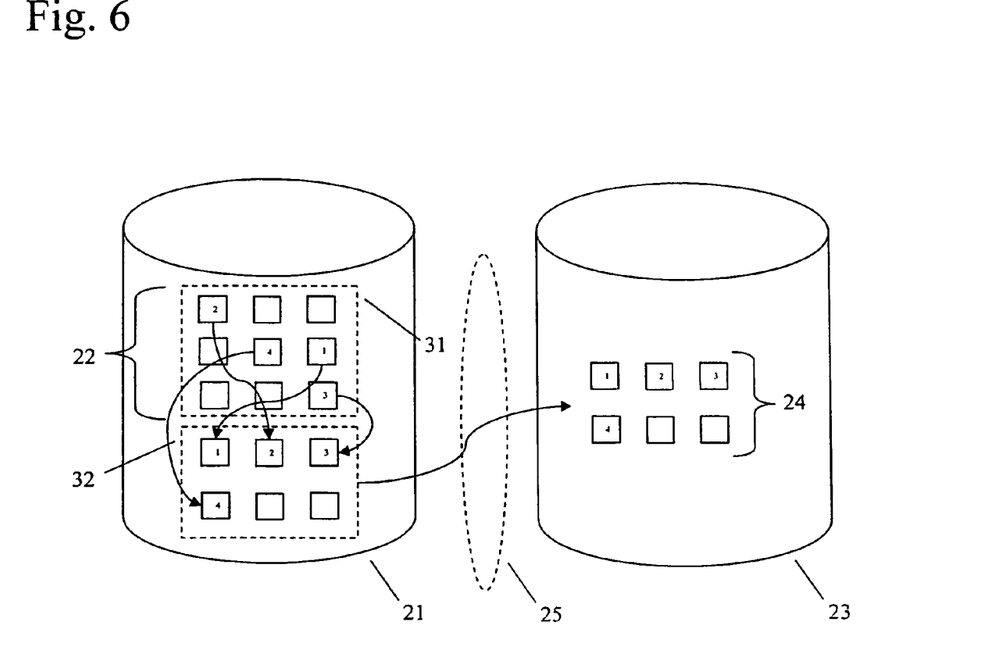
FIG. 6 is a schematic showing another embodiment of the present disclosure.
Figure 7:
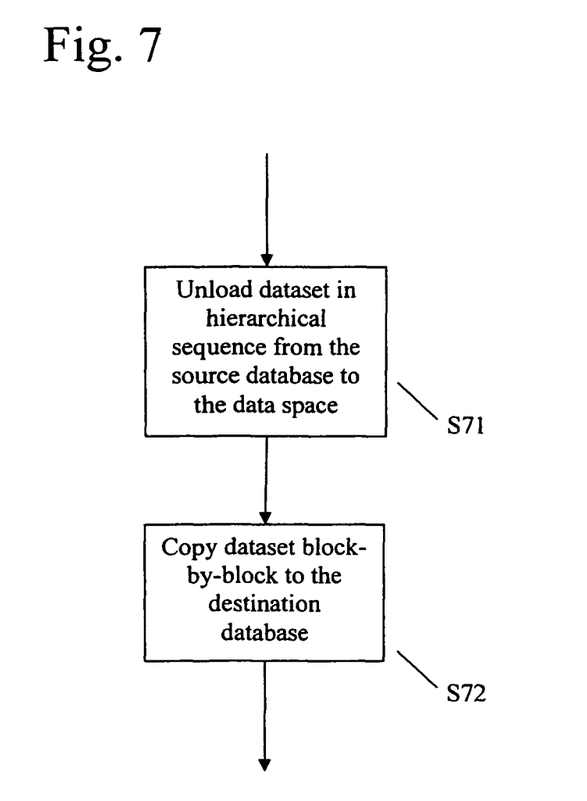
FIG. 7 is a flow chart for describing the embodiment of the present disclosure as shown in FIG. 6.

A method for unloading a database will be explained below with reference to FIGS. 6 and 7. FIG. 6 is a schematic showing another embodiment of the present disclosure. FIG. 7 is a flow chart for describing the embodiment of the present disclosure as shown in FIG. 6. Here, the data space 32 may be located on the source storage device 21, for example the data space 32 may be associated with the source database 22. According to this embodiment, the data set 31 may be unloaded in hierarchical sequence from the source database 22 to the local data space 32 (Step S71). Next, the data space 32 may be unloaded to the destination database 24 (Step S72). This embodiment of the present disclosure may therefore allow for the unloading of a database data set while avoiding random I/O.

Figure 8:
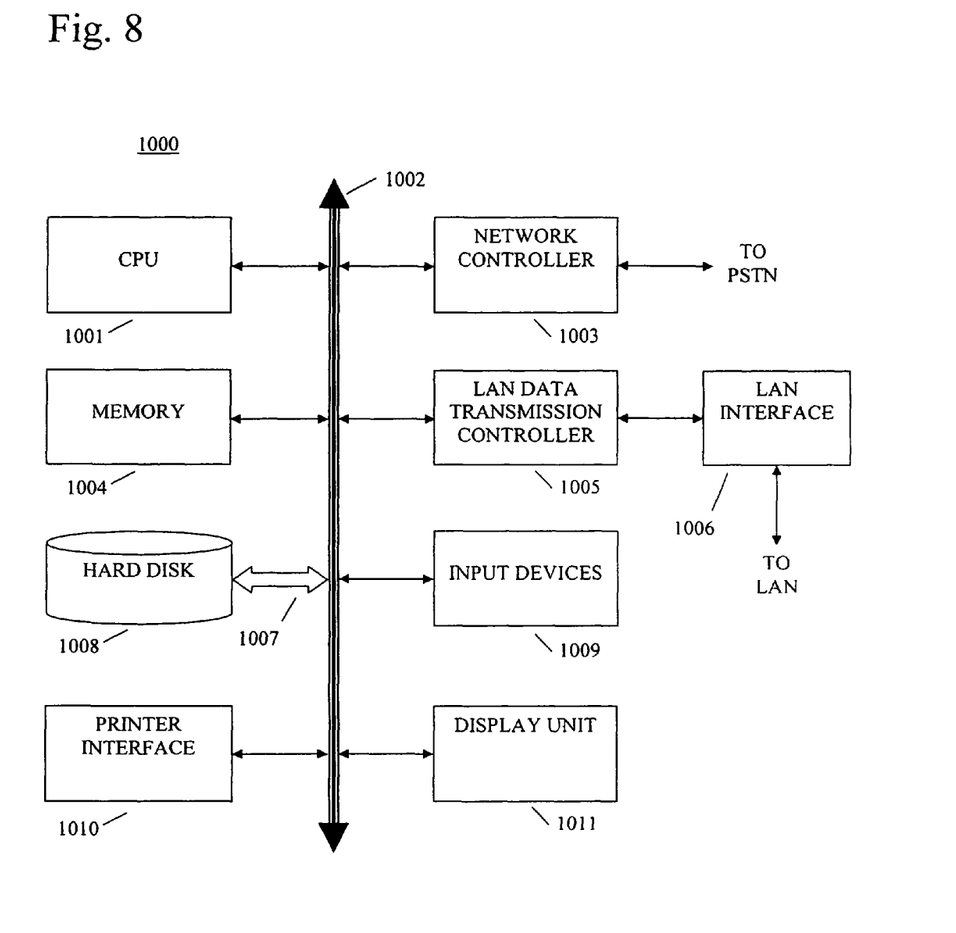
FIG. 8 shows an example of a computer system capable of implementing the method and apparatus according to embodiments of the present disclosure.

FIG. 8 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. Of course, other types of systems may be used to implement embodiments of the present disclosure The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for unloading a database, comprising:
   determining a start address and an end address of a data set in a database, the database comprising information organized in a hierarchical sequence, the database stored on a storage device in a physical sequence;
   copying the data set in physical sequence from the database to a data space, the data set comprising a plurality of continuous physical storage units, wherein copying the data set in physical sequence comprises reading the data set from the determined start address to the determined end address and writing the data set to the data space;
   determining whether a segment of database data is located in the data space;
   in response to determining that the segment of the database data is located in the data space, unloading the segment of the database data from the data space in hierarchical sequence; and
   in response to determining that the segment of the database data is not located in the data space, unloading the segment of the database data from the database.

2. The method of claim 1, wherein copying a data set in physical sequence comprises:
   reading the data set in physical sequence from the database; and
   writing the data set in physical sequence to the data space.

3. The method of claim 1, wherein said database is stored on a source storage device and said data set is unloaded onto a destination storage device.

4. The method of claim 3, wherein said data space is stored on the source storage device.

5. The method of claim 3, wherein said data space is stored on the destination storage device.

6. The method of claim 1, wherein the data space is comprised of two or more data spaces that are separately addressable.

7. The method of claim 1, wherein the data set is comprised of two or more data set sections that are each themselves data sets.

8. The method of claim 7, wherein one of said data set sections is an overflow data set.

9. The method of claim 8, wherein the overflow data set is in an HDAM database.

10. The method of claim 7, wherein one of said data set sections is a secondary data set group.

11. The method of claim 1, wherein data from the data set is only copied to the data space when it is determined the data should be copied to the data space and the data from the data set is not copied to the data space when it is determined that the data should not be copied to the data set; and
    data that is copied to the data space is unloaded from the data space and data that is not copied to the data space is unloaded from the data set.

12. The method of claim 11, wherein it is determined that the data should be copied when the data includes database records longer than a predetermined amount.

13. The method of claim 1, wherein one or more initializing steps are performed prior to the copying of the data set in physical sequence from the database to a data space.

14. The method of claim 13, wherein the one more initializing steps comprise one or more of:
    initializing one or more control blocks used to manage the data space;
    creating one or more data spaces;
    initializing one or more I/O buffers; and
    opening the database data set.

15. The method of claim 1, wherein one or more termination steps are performed after unloading the data set in hierarchical sequence from the data space.

16. The method of claim 15, wherein one or more of the termination steps include deleting one or more created data spaces.

17. A system for unloading a database, comprising:
at least one determining unit for determining a start address and an end address of a data set in a database, the database comprising information organized in a hierarchical sequence, the database stored on a storage device in a physical sequence;
a copying unit for copying the data set in physical sequence from the database to a data space, the data set comprising a plurality of continuous physical storage units, wherein copying the data set in physical sequence comprises reading the data set from the determined start address to the determined end address and writing the data set to the data space;
the at least one determining unit determining whether a segment of database data is located in the data space;
the at least one unloading unit for, in response to determining that the segment of the database data is located in the data space, unloading the segment of the database data from the data space in hierarchical sequence; and
the at least one unloading unit for, in response to determining that the segment of the database data is not located in the data space, unloading the segment of the database data from the database.

18. The system of claim 17, wherein the copying unit comprises:
a reading unit for reading the data set in physical sequence from the database; and
a writing unit for writing the data set in physical sequence to the data space.

19. The system of claim 17, wherein said database is stored on a source storage device and said data set is unloaded onto a destination storage device.

20. The system of claim 19, wherein said data space is stored on the source storage device.

21. The system of claim 19, wherein said data space is stored on the destination storage device.

22. The system of claim 17, wherein said data space is stored on a memory buffer.

23. The system of claim 17, wherein the data space is comprised of two or more data spaces that are separately addressable.

24. The system of claim 17, wherein the data set is comprised of two or more data set sections that are each themselves data sets.

25. The system of claim 24, wherein one of said data set sections is an overflow data set.

26. The system of claim 25, wherein the overflow data set is in an HDAM database.

27. The system of claim 24, wherein one of said data set sections is a secondary data set group.

28. The system of claim 17, wherein data from the data set is only copied to the data space when it is determined the data should be copied to the data space and the data from the data set is not copied to the data space when it is determined that the data should not be copied to the data set; and
data that is copied to the data space is unloaded from the data space and data that is not copied to the data space is unloaded from the data set.

29. The system of claim 28, wherein it is determined that the data should be copied when the data includes database records longer than a predetermined amount.

30. The system of claim 17, wherein an initializing unit is provided for performing one or more initializing steps prior to the copying of the data set in physical sequence from the database to a data space.

31. The system of claim 30, wherein the initializing unit includes one or more of: a control block-initializing unit for initializing one or more control blocks used to manage the data space;
a creating unit for creating one or more data spaces;
an I/O buffer-initializing unit for initializing one or more I/O buffers; and
an opening unit for opening the database data set.

32. The system of claim 17, wherein a terminating unit is provided for performing one or more termination steps after unloading the data set in hierarchical sequence from the data space.

33. The system of claim 32, wherein the terminating unit deletes one or more created data spaces.

34. A computer system comprising:
a processor; and
a computer recording medium readable by the computer system, including computer executable code executable by the processor for unloading a database, the computer executable code comprising:
code for determining a start address and an end address of a data set in a database, the database comprising information organized in a hierarchical sequence, the database stored on a storage device in a physical sequence;
code for copying the data set in physical sequence from the database to a data space, the data set comprising a plurality of continuous physical storage units, wherein copying the data set in physical sequence comprises reading the data set from the determined start address to the determined end address and writing the data set to the data space;
code for determining whether a segment of database data is located in the data space;
code for, in response to determining that the segment of the database data is located in the data space, unloading the segment of the database data from the data space in hierarchical sequence; and
code for, in response to determining that the segment of the database data is not located in the data space, unloading the segment of the database data from the database.

35. The computer system of claim 34, wherein the code for copying a data set in physical sequence comprises:
code for reading the data set in physical sequence from the database; and
code for writing the data set in physical sequence to the data space.

36. The computer system of claim 34, wherein said database is stored on a source storage device and said data set is unloaded onto a destination storage device.

37. The computer system of claim 36, wherein said data space is stored on the source storage device.

38. The computer system of claim 36, wherein said data space is stored on the destination storage device.

39. The computer system of claim 34, wherein the data space is comprised of two or more data spaces that are separately addressable.

40. The computer system of claim 34, wherein the data set is comprised of two or more data set sections that are each themselves data sets.

41. The computer system of claim 40, wherein one of said data set sections is an overflow data set.

42. The computer system of claim 41, wherein the overflow data set is in an HDAM database.

43. The computer system of claim 40, wherein one of said data set sections is a secondary data set group.

44. The computer system of claim 34, wherein data from the data set is only copied to the data space when it is determined the data should be copied to the data space and the data from the data set is not copied to the data space when it is determined that the data should not be copied to the data set; and data that is copied to the data space is unloaded from the data space and data that is not copied to the data space is unloaded from the data set.

45. The computer system of claim 44, wherein it is determined that the data should be copied when the data includes database records longer than a predetermined amount.

46. The computer system of claim 34, wherein one or more initializing steps are performed prior to the copying of the data set in physical sequence from the database to a data space.

47. The computer system of claim 46, wherein the one more initializing steps comprises one or more of:
 initializing one or more control blocks used to manage the data space;
 creating one or more data spaces;
 initializing one or more I/O buffers; and
 opening the database data set.

48. The computer system of claim 34, wherein one or more termination steps are performed after unloading the data set in hierarchical sequence from the data space.

49. The computer system of claim 48, wherein one or more of the termination steps include deleting one or more created data spaces.

50. A computer recording medium including computer executable code for unloading a database, the computer executable code comprising:
 code for determining a start address and an end address of a data set in a database, the database comprising information organized in a hierarchical sequence, the database stored on a storage device in a physical sequence;
 code for copying the data set in physical sequence from the database to a data space, the data set comprising a plurality of continuous physical storage units, wherein copying the data set in physical sequence comprises reading the data set from the determined start address to the determined end address and writing the data set to the data space;
 code for determining whether a segment of database data is located in the data space;
 code for, in response to determining that the segment of the database data is located in the data space, unloading the segment of the database data from the data space in hierarchical sequence; and
 code for, in response to determining that the segment of the database data is not located in the data space, unloading the segment of the database data from the database.

51. The computer recording medium of claim 50, wherein the code for copying a data set in physical sequence comprises:

code for reading the data set in physical sequence from the database; and
 code for writing the data set in physical sequence to the data space.

52. The computer recording medium of claim 50, wherein said database is stored on a source storage device and said data set is unloaded onto a destination storage device.

53. The computer recording medium of claim 52, wherein said data space is stored on the source storage device.

54. The computer recording medium of claim 52, wherein said data space is stored on the destination storage device.

55. The computer recording medium of claim 50, wherein the data space is comprised of two or more data spaces each separately addressable.

56. The computer recording medium of claim 50, wherein the data set is comprised of two or more data set sections that are each themselves data sets.

57. The computer recordable medium of claim 56, wherein one of said data set sections is an overflow data set.

58. The computer recordable medium of claim 57, wherein the overflow data set is in an HDAM database.

59. The computer recordable medium of claim 56, wherein one of said data set sections is a secondary data set group.

60. The computer recording medium of claim 50, wherein data from the data set is only copied to the data space when it is determined the data should be copied to the data space and the data from the data set is not copied to the data space when it is determined that the data should not be copied to the data set; and data that is copied to the data space is unloaded from the data space and data that is not copied to the data space is unloaded from the data set.

61. The computer recording medium of claim 60, wherein it is determined that the data should be copied when the data includes database records longer than a predetermined amount.

62. The computer recording medium of claim 50, wherein one or more initializing steps are performed prior to the copying of the data set in physical sequence from the database to a data space.

63. The computer recording medium of claim 62, wherein the one more initializing steps comprise one or more of:
 initializing one or more control blocks used to manage the data space;
 creating one or more data spaces;
 initializing one or more I/O buffers; and
 opening the database data set.

64. The computer recording medium of claim 50, wherein one or more termination steps are performed after unloading the data set in hierarchical sequence from the data space.

65. The computer recording medium of claim 64, wherein one or more of the termination steps include deleting one or more created data spaces.

* * * * *